Jan. 30, 1962  P. R. H. ROBERSON  3,018,554
FOOT MEASURING DEVICE
Filed March 3, 1958  2 Sheets-Sheet 1

INVENTOR.
PEGGY RUTH HEARD ROBERSON
BY *Elliott & Pastoriza*
ATTORNEYS

Jan. 30, 1962   P. R. H. ROBERSON   3,018,554
FOOT MEASURING DEVICE
Filed March 3, 1958   2 Sheets-Sheet 2

INVENTOR.
PEGGY RUTH HEARD ROBERSON
BY *Elliott & Pastoriza*
ATTORNEYS

United States Patent Office 3,018,554
Patented Jan. 30, 1962

3,018,554
FOOT MEASURING DEVICE
Peggie Ruth Heard Roberson, San Francisco, Calif.
(1306 E. Firestone Blvd., Los Angeles 1, Calif.)
Filed Mar. 3, 1958, Ser. No. 718,926
4 Claims. (Cl. 33—3)

This invention relates to a Foot Measuring Device, more specifically to a plastic article with movable scaled parts for measuring the various dimensions of the human foot.

It is an object of the present invention to provide an article of the class described for the proper fitting of shoes relative to the overall dimensions of the length and width of the foot, height of the arch, flare and height of the metatarsals and curvature of the heel.

It is another object of the present invention to provide an article of the class described which is a precision scientific device for measuring the following; the length of the foot or any of its segments, including, measurement of length from heel to distal aspect of digits, measurement of length from heel to first through fifth metatarsophalangeal, proximal interphalangeal and distal interphalangeal joints, measurement of length from heel to level of the tarsometatarsal joints, measurement of length of toes, and measurement of length of foot in an altered state as may be seen in partial amputees or deformed feet, the width and circumference at any segment of the foot, the height of any segment of the foot, and the curvature of the heel of the foot.

Other objects of the present invention are to provide an article of the class described bearing the above objects in mind which is of simple construction, inexpensive to manufacture, has a minimum number of parts, is easy to use and efficient in its intended purpose.

For other objects and a better understanding of the invention, reference may be had to the following detailed description taken in connection with the accompanying drawing, in which.

Figure 1:
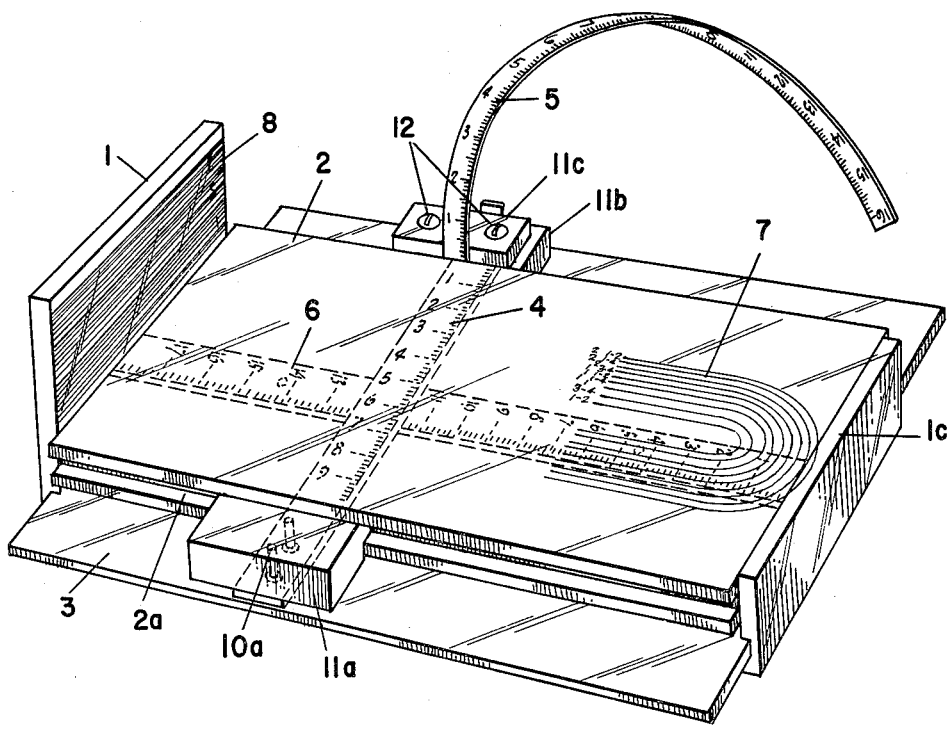
FIG. 1 is a perspective view of a preferred embodiment of the invention.

Referring now in more detail to the drawing, in which similar reference numerals identify corresponding parts throughout the several views, there is shown in FIG. 1 a Foot Measuring Device with its stationary vertical scale 8 calibrated in centimeters and etched on the inside face of the front support 1 permitting measurement of the thickness of the toes at their distal aspect. A longitudinal scale portion 6 calibrated in centimeters, which is used to measure the length of the foot as a whole or the length of any segment, is attached to the bottom of the laterally sliding longitudinal scale plate 3 and is clearly seen through the clear plastic of said plate 3 and the base plate 2 the latter being rigidly secured to front support 1 and a rear support 1c. Also seen through the clear plastic of said plate 2 is the lateral scale portion 4 which slides longitudinally just beneath the said plate 2 by means of its attached lateral supports 11a, 11b which slide along the longitudinal grooves 2a, 2b in the base plate 2 and permit the measurement, in centimeters, of the width of any portion of the foot. A flexible metal tape 5, calibrated in centimeters, shown secured at one end between the lateral support 11b and the tape support 11c by the screws 12, is used for measuring vertical dimension along the inner or outer border of the foot and also permits measurement of the circumference of the various areas of the foot. Calibrated arcs 7 etched on the base plate 2 at the distal end measure the shape of the posterior aspect of the heel. When the foot is placed on the base plate 2 with the heel centered on the calibrated arcs 7, the heel will be found to be in line with two arcs because it is unsymmetrical, the inner half matching one arc and the outer half matching another arc. As these arc segments are projected together, the shape of the heel is represented and the measurement is expressed as the radii of the circles of which the arcs are segments.

Figure 2:
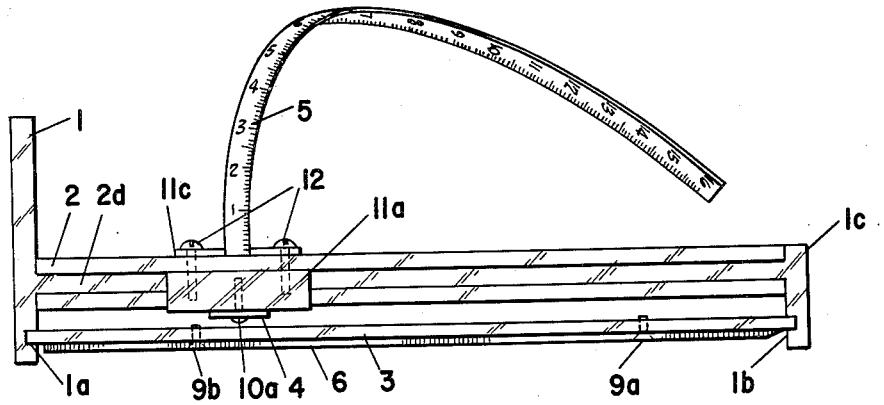
FIG. 2 is a side elevation view of the invention.

Referring now particularly to FIG. 2, essentially the same members are shown as in FIG. 1. Metal screws 9a, 9b secure the longitudinal scale 6 to the bottom of the longitudinal scale plate 3 which slides laterally in the lateral grooves 1a, 1b.

Figure 3:
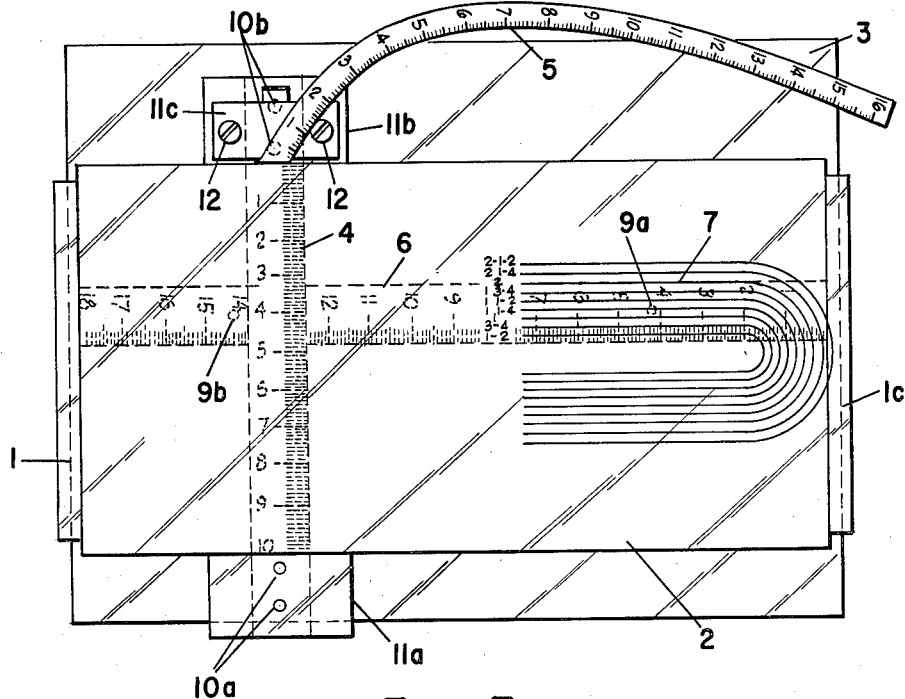
FIG. 3 is a plan view of the invention, showing the various measures.

Referring now particularly to FIG. 3, there is shown a top perspective view of the invention illustrating more clearly the positioning of the various scales.

Figure 4:
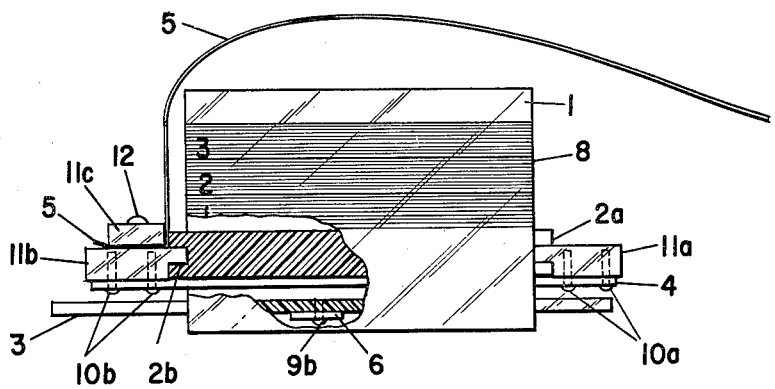
FIG. 4 is a front elevation view of the invention, partly in section.

Referring now particularly to FIG. 4, there is shown the vertical scale 8 etched into the front support 1. Metal screws 10a, 10b secure the lateral scale 4 to the lateral supports 11a, 11b which slide along the longitudinal grooves 2a, 2b.

The over-all combination and operation of the element heretofore identified may now be described.

The front support member 1 and the rear support member 1c co-function together as a means of structurally retaining the base plate 2 interposed therebetween. In addition, by the provision of laterally extending grooves 1a and 1b in the front support member 1 and rear support member 1c, these members also function as a means of slidably retaining the laterally movable scale plate 3.

The base plate 2, as heretofore mentioned, includes grooves 2a and 2b formed on the opposite side portions thereof which slidably receive therein support members 11a and 11b, the latter structurally retaining the lateral scale 4.

Thus, the lateral scale 4 is longitudinally slidable in coupled relationship to the base plate 2 through means of its support members 11a and 11b mounted in grooves 2a and 2b of the base plate 2. Also, the scale plate 3 is laterally movable in the front support member 1 and rear support member 1c in the grooves 1a and 1b respectively provided in the support members 1 and 1c. Since the longitudinal scale 6 is attached to the scale plate 3 as by the screws 9a and 9b, it is apparent that the scale 6 is also laterally movable.

In addition to the movable scales 4 and 6, the precision pedometer of the present invention also embodies the stationary vertical scale 8 provided on the front support member 1 and the arcuate scale 7 provided on the base plate 2.

The tape 5 supplements the movable scales and stationary scales as heretofore described, and has one end secured, as heretofore described, between the tape support 11c and lateral support 11b.

With this type of construction, the foot of the individual being measured may be placed on the base support 2 with the heel thereof disposed in the arcuately scribed section 7 thereof. The toes would be adjacent the front support member 1 and more particularly the vertical scale 8 thereof. In consequence, an immediate measurement is made of the height of the respective toes on the vertical scale 8 while the heel is measured by the arcuate segments 7.

Thereafter, the lateral scale 4 may be moved longitudinally to establish measurement of the width of any portion of the foot. Also, the longitudinal scale 6 will be moved laterally to establish the length of any portion of the foot. The tape 5 which is slidable with the lateral scale 4 will thereafter be employed to measure the vertical dimension of the foot or to measure the overall circumference of any portion thereof in combination with the lateral scale 4.

As a consequence of the various movable and stationary scales together with the tape indicated, measurements of all portions of the foot may be readily obtained in the precision pedometer according to the present invention.

While various changes may be made in the detailed construction, such changes shall be within the spirit and scope of the present invention as defined by the appended claims.

Having thus described my invention, what I claim as new, and desire to secure by United States Letters Patent is:

1. A foot measuring device comprising in combination: a first vertical member; a second vertical member; a transparent horizontal member for receiving said foot interposed between and having its opposite end portions rigidly connected to said first and second vertical members, respectively; longitudinally movable laterally extending measuring means coupled to said horizontal member in slidable relationship for measuring the width of various portions of said foot, said longitudinally movable laterally extending measuring means having a scale portion underlying said horizontal member; and, laterally movable longitudinally extending measuring means coupled in slidable relationship to said first and second vertical members for measuring the length of various portions of said foot.

2. A foot measuring device comprising, in combination: a first vertical member; a second vertical member; a transparent horizontal member for receiving said foot interposed between and having its opposite end portions rigidly connected to said first and second vertical members, respectively; longitudinally movable laterally extending measuring means coupled in slidable relationship to said horizontal member for measuring the width of various portions of said foot; and, laterally movable longitudinally extending measuring means coupled in slidable relationship to said first and second vertical members for measuring the length of various portions of said foot, said laterally movable longitudinally extending measuring means having a scale portion underlying said horizontal member.

3. A foot measuring device comprising, in combination: a first vertical member having a laterally extending groove; a second vertical member having a laterally extending groove; a transparent horizontal member for receiving said foot interposed between and having its opposite end portions connected to said first and second vertical members, respectively, said horizontal member defining in its opposing sidewalls elongated grooves; longitudinally movable laterally extending measuring means coupled for slidable movement in said elongated grooves for measuring the width of various portions of said foot; and, laterally movable longitudinally extending measuring means coupled for slidable movement in said laterally extending grooves of said vertical members for measuring the length of various portions of said foot.

4. A foot measuring device, according to claim 3, in which said laterally movable measuring means and said longitudinally movable measuring means, respectively, embody a scale portion underlying said transparent horizontal member.

References Cited in the file of this patent

UNITED STATES PATENTS

| | | |
|---|---|---|
| 827,447 | Iberg | July 31, 1906 |
| 1,568,072 | Krueger | Jan. 5, 1926 |
| 2,519,677 | MacKay | Aug. 22, 1950 |
| 2,522,899 | Schlaugh | Sept. 19, 1950 |
| 2,535,296 | Laing | Dec. 26, 1950 |
| 2,696,051 | Perman | Dec. 7, 1954 |
| 2,782,504 | Del Pesco | Feb. 26, 1957 |

FOREIGN PATENTS

| | | |
|---|---|---|
| 8,918 | Great Britain | June 22, 1887 |